United States Patent

Baheri et al.

[11] Patent Number: 5,452,153
[45] Date of Patent: Sep. 19, 1995

[54] SERVO CONTROLLED MAGNETIC HEAD POSITIONER

[75] Inventors: Hamid Baheri, Sherman Oaks; Peter Campbell, Los Angeles; Daniel L. Griffith, Ventura; Jefferson H. Harman, Thousand Oaks, all of Calif.

[73] Assignee: Wangtek, Inc., Simi Valley, Calif.

[21] Appl. No.: 277,118

[22] Filed: Jul. 19, 1994

Related U.S. Application Data

[63] Continuation of Ser. No. 911,595, Jul. 10, 1992, abandoned.

[51] Int. Cl.6 .................. G11B 5/596; G11B 21/02
[52] U.S. Cl. ............................ 360/78.05; 360/78.13; 360/75
[58] Field of Search ............ 360/78.05, 75, 109, 360/106, 78.12, 78.13; 318/592

[56] References Cited

U.S. PATENT DOCUMENTS

| | | | |
|---|---|---|---|
| 3,924,268 | 12/1975 | McIntosh et al. | 360/78.05 |
| 4,308,474 | 12/1981 | Savage et al. | 310/26 |
| 4,609,402 | 9/1986 | McMasters | 75/65 |
| 4,614,986 | 9/1986 | LaBudde | 360/78.05 |
| 4,770,704 | 9/1988 | Gibson et al. | 75/65 |
| 4,818,304 | 4/1989 | Verhoeven et al. | 148/103 |
| 4,849,034 | 7/1989 | Verhoeven et al. | 148/100 |
| 4,916,555 | 4/1990 | Hathaway et al. | 360/10.1 |
| 4,924,325 | 5/1990 | Yamashita | 360/10.2 |
| 4,959,567 | 9/1990 | Ealey et al. | 310/26 |
| 4,963,806 | 10/1990 | Shinohara et al. | 360/77.13 |
| 5,091,808 | 2/1992 | Nigam | 360/78.05 |
| 5,262,707 | 11/1993 | Okazaki et al. | 318/615 |
| 5,280,402 | 1/1994 | Anderson et al. | 360/77.12 |

FOREIGN PATENT DOCUMENTS 53-96805 8/1978 Japan.

OTHER PUBLICATIONS

Goodfriend, Mel, "Material Breakthrough Spurs Acturator Design", Machine Design, Mar. 21, 1991, pp. 147–150.

*Primary Examiner*—Aristotelis Psitos
*Assistant Examiner*—Varsha Kapadia
*Attorney, Agent, or Firm*—Robbins, Berliner and Carson

[57] ABSTRACT

A magnetic recording head positioning system includes a Terfenol-D magnetostrictive rod prestressed by a lever arm to operate in a linear range to microposition the magnetic recording head in accordance with an electromagnetic field. The mechanical advantage of the lever arm amplifies changes in the magnetostrictive rod to position the head. The varying electromagnetic field is applied to the rod by a coil in response to a position error signal produced from servo data tracks on the magnetic tape. A permanent magnet system biases the magnetostrictive element with a DC field so that varying the field provides bi-directional motion of the magnetic recording head. The DC field also reduces coil current and size requirements. The position signal is filtered so that changes in length of the magnetostrictive rod provide fast, fine positioning of the head while a stepper motor and lead screw subassembly system provide slow, coarse positioning of the magnetic recording head by moving the magnetostrictive element assembly in an open loop and/or closed or servo loop mode.

35 Claims, 1 Drawing Sheet

SERVO CONTROLLED MAGNETIC HEAD POSITIONER

This is a continuation of application Ser. No. 07/911,595, filed Jul. 10, 1992, which was abandoned upon the filing hereof.

BACKGROUND OF THE INVENTION

1. Field of the Invention

This invention relates generally to techniques for maintaining the position of read/write heads in alignment with tracks of data stored on magnetic media, such as disk drives and magnetic tape drives. In particular the present invention relates to a servo controlled, magnetic head positioning system.

2. Description of the Prior Art

In a conventional magnetic tape drive system, multiple read/write head groups are generally mounted within a carriage and used to perform read/write operations on magnetic media, particularly magnetic recording media such as magnetic tape. The drive system typically includes a positioning mechanism, such as a stepper motor, that moves the carriage to position the heads with respect to the tape. The stepper motor receives position instructions from the system processor using servo data from the tape read by a magnetic head, particularly a magnetic recording head such as a tape head.

The accuracy and repeatability of tape head positioning and tracking with respect to the tape is a critical factor in the operation of such drive systems. One common problem is AC offset, that is, AC head to tape misalignment. In addition, motion of the magnetic tape itself perpendicular to the normal direction of tape motion, called "tape wander", contributes to this problem. The conventional limits of such accuracy and repeatability of positioning and tracking are some of the major limiting factors in ongoing developments of tape drive systems with increased accuracy and data density.

What is needed is a head positioning and tracking technique with greater accuracy and repeatability than is conventionally available, particularly with respect to the ability to compensate for AC offset of the head with respect to a data track and with respect to track perpendicular tape wander.

SUMMARY OF THE INVENTION

The preceding and other shortcomings of prior art systems are addressed and overcome by the present invention that provides a system for positioning a magnetic recording head with respect to magnetic recording media including a magnetic recording head, means for generating a position signal, means responsive to the position signal to vary a magnetic field, and a magnetostrictive element responsive to the magnetic field for positioning the magnetic recording head in accordance with the position signal.

In another aspect, the present invention provides a method of positioning a magnetic recording head with respect to magnetic recording media by generating a position signal, varying a magnetic field in response to the position signal, and applying the magnetic field to a magnetostrictive element to position the magnetic recording head in accordance with the position signal.

In yet another aspect, the present invention provides a system for positioning a magnetic recording head with respect to magnetic recording media having a magnetic recording head positionable with respect to magnetic recording media, means for generating a position signal in response to servo data detected by the magnetic recording head, an electromagnetic coil for varying a magnetic field in response to the position signal, a magnetostrictive element responsive to the magnetic field, and lever means for prestressing the magnetostrictive element and positioning the magnetic recording head in accordance with the position signal.

In another aspect, the present invention provides a method of positioning a magnetic recording head with respect to magnetic recording media by positioning a magnetic recording head with respect to magnetic recording media, generating a position signal in response to servo data detected by the magnetic recording head, varying a magnetic field in response to the position signal, applying the varying magnetic field to the magnetostrictive element, prestressing the magnetostrictive element with a lever, and positioning the magnetic recording head with the lever in response to the position signal.

In a further aspect, the present invention provides a method of positioning a head assembly in a data storage system by coarsely positioning the head assembly with a stepper motor in accordance with a position signal and micro-positioning the head assembly in response to the position signal. The coarse positioning of the head assembly may be accomplished by positioning the head assembly to a step position having a predetermined relationship to the position signal, positioning the head to a position represented by the position signal, and adjusting the position of the head in response to any detected difference between the position of the head and the position represented by the position signal.

In a still further aspect, the invention provides a head assembly for use in a data storage system including a data head, stepper means responsive to a position signal for coarsely positioning the head and micro-positioning means responsive to the position signal for finely positioning the data head. The head assembly may include open loop means for positioning the head to a step position having a predetermined relationship to the position signal, servo loop means for positioning the data head to a position represented by the position signal, and feedback means for adjusting the position of the data head in response to any detected difference between the position of the data head and the position represented by the position signal.

The magnetostrictive element may be biased at a bi-directional linear operating point. A lever arm is used to provide mechanical advantage to increase the range of head motion with respect to changes in length of the magnetostrictive element while prestressing the element by compression. A permanent magnet system may be used to reduce electromagnetic coil current.

The foregoing and additional features and advantages of this invention will become further apparent from the detailed description and accompanying drawing figures that follow. In the figures and written description, numerals indicate the various features of the invention, like numerals referring to like features throughout for both the drawing figures and the written description.

DETAILED DESCRIPTION OF PREFERRED EMBODIMENT(S)

Figure 1:
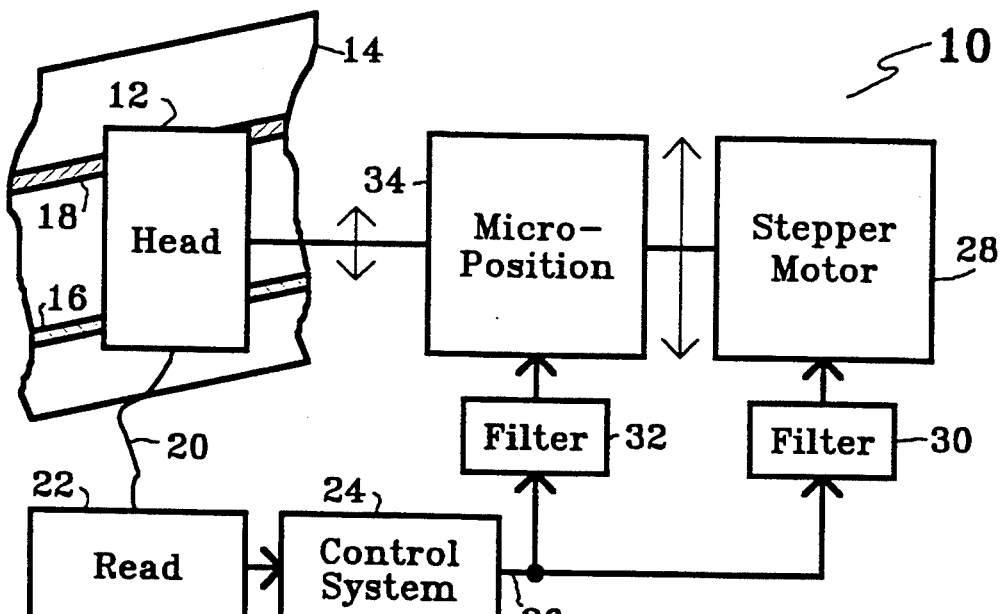
FIG. 1 is a schematic illustration of a servo controlled magnetic recording head positioning system in accordance with the present invention.

FIG. 1 is a schematic illustration of magnetic tape drive positioning system 10 according to the present invention for positioning tape head 12 with respect to magnetic tape segment 14 which contains data tracks 16. Tape head position feedback information is provided by a position sensor, which conveniently may be tape head 12 or a portion thereof, reading servo data tracks 18 on magnetic tape segment 14. Servo data signals from tape head 12 are connected by means of head cable 20 to read system 22 which may be any conventional tape head read system operating in a conventional manner and compatible with the feedback position sensor arrangement, such as servo tracks 18.

One of the outputs from read system 22 is the servo data position feedback information applied to control system 24 to produce head position error signal 26. Head position error signal 26 is applied to stepper motor 28 which positions tape head 12 with respect to magnetic tape segment 14 in accordance with position error signal 26. Head position error signal 26 may be used in a conventional open loop manner to operate stepper motor 28 to position tape head 12 to a step position, for example from one track to another, and may also be used in a closed loop or feedback servo system to position tape head 12 for coarse feedback positioning, for example, to compensate for low frequency tracking errors such as those caused by temperature, or tape dimension, variations.

Head position error signal 26 is also applied to micro-positioning subsystem 34 to micro-position tape head 12 relatively quickly and more finely when compared to the slower and coarser position control applied by stepper motor 28 operating in either the open loop mode, in the closed loop servo mode, or a combined positioning mode using both open and servo loop positioning.

In accordance with one embodiment of the present invention, signal conditioning may be applied to head position error signal 26 before use by stepper motor 28 and micro-positioning subsystem 34. For example, as shown in FIG. 1, low frequency filter 30 may be used to condition head position error signal 26 before application to stepper motor 28 so that stepper motor 28 operates to achieve coarse position adjustment of tape head 12 with respect to magnetic tape segment 14. As noted above, such operation of stepper motor 28 may be in a conventional open loop positioning mode and/or in a closed loop servo positioning mode using head position error signal 26 as a position feedback information signal.

Similarly, head position error signal 26 may be applied to high frequency filter 32 which serves to apply only the higher frequency portion of head position error signal 26 to fine or micro-positioning subsystem 34.

In such an embodiment, low frequency filter 30 would have an upper corner frequency on the order of about 10 Hz. while the lower corner frequency of high frequency filter 32 would be on the order of 1 Hz. This overlap provides system stability. The minimum servo bandwidth of micro-positioning subsystem 34 should be on the order of at least about 500 Hz.

Figure 2:
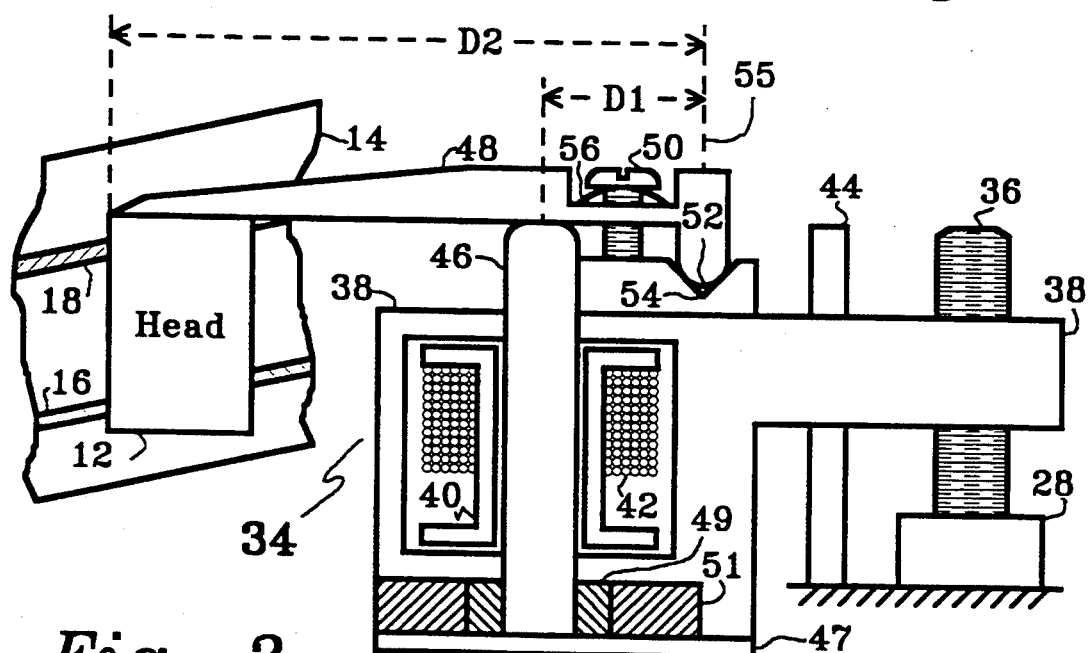
FIG. 2 is a cross sectional view of the micro-positioning subsystem and stepper motor used to position the magnetic recording head, as shown in FIG. 1.

Referring now also to FIG. 2, magnetostrictive positioning subsystem 34 is shown in cross section. Micro-positioning subsystem 34 supports tape head 12 and in turn is supported by lead screw 36 which is driven by stepper motor 28 so that stepper motor 28 provides coarse positioning of tape head 12 with respect to magnetic tape segment 14 while micro-positioning subsystem 34 provides fine positioning with respect thereto. That is, the low frequency components of head position error signal 26 are applied to stepper motor 28 in an open loop, servo loop and/or combined open and servo loop mode of operation to cause rotation of lead screw 36 to coarsely position tape head 12 while finer positioning of tape head 12 is accomplished by applying the higher frequency components of head position error signal 26 to micro-positioning subsystem 34, as described below.

Micro-positioning subsystem 34 includes housing 38 in threaded contact with lead screw 36 and in sliding contact with guide pin 44. Guide pin 44 serves to prevent rotation of housing 38 so that stepper motor 28 may be used to move micro-positioning subsystem 34 up or down by rotation of lead screw 36. Housing 38 contains bobbin 40 and electromagnetic coil system 42 which may both conveniently concentrically surround magnetostrictive element 46. Magnetostrictive element 46 is supported on bottom plate 47 which supports pole piece 49 surrounding the bottom portion of magnetostrictive element 46. Bottom plate 47 also supports permanent magnet system 51 which surrounds pole piece 49.

Figure 3:
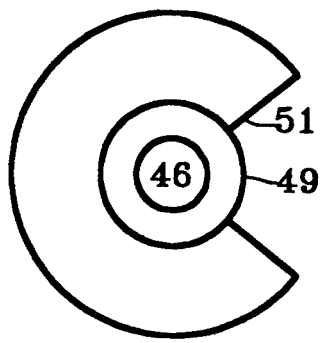
FIG. 3 is a top view of the permanent magnet system and pole piece used in the micro-positioning subsystem shown in FIG. 2.

As may be more clearly seen in FIG. 3, permanent magnet system 51 may be in the form of a generally horseshoe-shaped rare earth magnequench or MQ1 type permanent magnet having a circumference of about 270°. Permanent magnet system 51 partially surrounds pole piece 49 which provides a return path for the magnetic field.

Tape head 12 is supported by lever arm 48 mounted to housing 38 by screw 50. In accordance with the present invention, lever arm 48 is in the form of a stiff, cantilevered spring, one end of which includes pivot point 52 pressed into cradle 54 so that lever arm 48 is compressed against magnetostrictive element 46 by screw 50. The mass of lever arm 48 is very small so that the total mass to be moved by micro-positioning subsystem 34 with respect to housing 38 is substantially only the mass of tape head 12.

Figure 4:
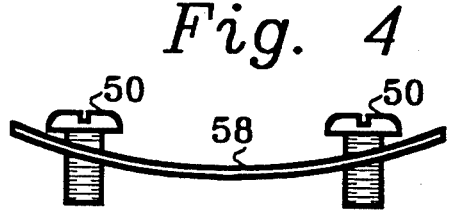
FIG. 4 is a side view of an alternate embodiment of the compression spring and screw arrangement shown in FIG. 2.

As shown in FIG. 2, screw 50 may be fitted with a single, circular compression spring 56 for convenience in adjusting the compression applied to magnetostrictive element 46. In accordance with a preferred embodiment, as shown in FIG. 4, compression spring 56 may be in the form of leaf spring 58 which includes a pair of screws 50 for controlling the compression of magnetostrictive element 46 by lever arm 48.

Distance D1 along lever arm 48 from cantilever support axis 55 above pivot point 52 to magnetostrictive element 46 is substantially less than distance D2 from support axis 55 to tape head 12. A mechanical lever arm advantage is therefore applied to amplify any change in length of magnetostrictive element 46 into a substantially larger motion of tape head 12.

Permanent magnet system 51 is used to provide a DC magnetic bias to magnetostrictive element 46 while the compression applied by lever arm 48 as a result of the tightening of screw 50 against compression spring 56 applies a mechanical bias, in the form of compression on the order of about 2,000 psi, to prestress magnetostrictive element 46. These magnetic and mechanical biases are selected so that magnetostrictive element 46 may be operated in a bi-directional, linear portion of its range of magnetostrictive expansion by activation of coil system 42.

In other words, permanent magnet system 51 applies a DC bias to magnetostrictive element 46 which causes the element to expand against the mechanical compression applied by compression spring 56 to an operating or bias length. Increasing and decreasing the total effective magnetic field applied to magnetostrictive element 46 above and below this DC bias level by proper activation of coil system 42 permits magnetostrictive element 46 to increase and decrease its length from the bias length to operate as a micro-positioning element. The magnetic and mechanical biases may be selected so that such increases and decreases in the length of magnetostrictive element 46 about its bias length are generally linear. Magnetostrictive element 46 may therefore be said to operate in a relatively linear bi-direction range of length changes under the influence of coil system 42.

Micro-positioning subsystem 34 thereby operates to produce a displacement of tape head 12 substantially linearly related to head position error signal 26.

The magnetic bias applied to magnetostrictive element 46 by permanent magnet system 51 is opposed by applying current in one direction through coil system 42 to cause magnetostrictive element 46 to change in length in one direction. Current applied in the opposite direction through coil system 42 enhances the magnetic field applied by permanent magnet system 51 to cause magnetostrictive element 46 to change in length in the opposite direction.

In operation, high frequency components of head position error signal 26 are applied to coil system 42 in micro-positioning subsystem 34 to make the fine, fast tracking head movements required for proper tracking to compensate, for example, for tape wander. In addition, low frequency or DC components of head position error signal 26 are applied to stepper motor 28 to coarsely and slowly adjust the position of tape head 12 in a conventional open loop mode, in a servo loop mode using the servo data signal as a feedback position signal, or in a combined mode using both open and servo loop aspects. The high frequency components of error are applied to coil system 42 to cause changes in length of magnetostrictive element 46 to finely and quickly microposition tape head 12.

In addition to conventional open loop step positioning, stepper motor 28 may serve to reposition tape head 12 in a closed or servo loop mode to compensate, for example, for slow changes in operating temperature or tape position or dimensions. Operation of stepper motor 28 serves to reduce the current requirements of micropositioning subsystem 34 so that temperature changes due to heating of coil system 42 by constant or DC currents are minimized.

Magnetostrictive element 46 must be fabricated from a material whose length varies as a function of the magnetic field applied thereto. One suitable magnetostrictive material is known as Terfenol-D, which is a trademark of Edge Technologies. This material has the chemical composition described by the formula $Tb_xDy_{(1-x)}Fe_{(2-w)}$, where x is in the range of about 0.2 to 1.0 and w is in the range of about 0 to 0.2. In the preferred embodiment, the composition is selected to be $Tb_{0.27}Dy_{0.73}Fe_{1.97}$, which is available as the ETREMA product from Edge Technologies. Other suitable magnetostrictive materials include Triponal D, Tripin, Dirperson and Iron.

The linearity and range of displacement of the Terfenol-D magnetostrictive material used for element 46 improve with prestressing as provided by lever arm 48 under the control of screw 50 and compression spring 56. Compression spring 56 applies prestress to element 46 by adjustment of screw 50.

At a prestress level of about 2000 psi, the application of a magnetic field in either a positive or negative orientation causes magnetostrictive element 46 to change in length. However, since the change in length is small relative to the initial deflection of compression spring 56, the prestress level remains substantially constant. Micro-positioning subsystem 34 must be bi-directional which requires magnetostrictive element 46 to both increase and decrease in length in response to current applied to coil system 42. This is accomplished by biasing the Terfenol-D magnetostrictive element at approximately 550 Oe to an extended or bias length by means of permanent magnet system 51 so that both increase and decrease in length are roughly linear about this operating point.

The slope of the magnetic strain as a function of applied magnetic field in this linear region is given by magnetostrictive coefficient d, as follows:

$$d = \sqrt{(\mu^T k^2 / E^H)}$$
$$= 1.5 \times 10^{-8} \text{ m/A},$$

where $\mu^T$ is the "free" permeability, equal to about $9.2 \times \mu_o$, k is the coupling coefficient of about 0.72 and $E^H$ is Young's modulus for a "free" rod equal to about $2.65 \times 10^{10}$ N/m².

The field variation around this bias point in the preferred embodiment was chosen to range from plus or minus about 250 Oe to provide bi-directional operation. The operating range for magnetostrictive element 46 is therefore on the order of 300 to 800 Oe.

In a particular embodiment, in which the design goal was a motion of about plus or minus 17 μm, the length of magnetostrictive element 46 was selected to be 11.4 mm, the cross-sectional area was 4 mm² and the lever ratio was 5 to 1.

In accordance with the presently preferred embodiment shown in FIG. 2, the magnetic field is applied to magnetostrictive element 46 by the combination of permanent magnet system 51 and coil system 42. Permanent magnet system 51 provides the DC magnetic bias field and may conveniently include a horseshoe-shaped rare earth magnequench permanent magnet having a circumference of about 270°. Coil system 42 applies an alternating magnetic field to move tape head 12 about its operating point as described above.

In an alternate embodiment, the flux return path may include an outer steel cylinder as at least part of housing 38 which will provide additional magnetic shielding for tape head 12 from the magnetic fields generated by permanent magnet system 51 and coil system 42.

In another alternate embodiment, the magnetic field may be applied solely by coil system 42 for both the DC bias as well as the alternating magnetic fields. Although simpler in construction, this embodiment would probably be physically larger because the coil windings in coil system 42 would have to carry the DC bias current as well as the current for creating the alternating field.

While this invention has been described with reference to its presently preferred embodiment(s), its scope is not limited thereto. Rather, such scope is only limited insofar as defined by the following set of claims and all equivalents thereof.

What is claimed is:

1. A head assembly for use in a data storage system, comprising:
    a data head;
    stepper means for coarsely positioning the data head in accordance with a position signal, wherein the stepper means further comprises:
        servo loop means for coarsely positioning the data head to a position represented by the position signal; and
        feedback means comprising a low frequency filter for adjusting the position of the data head in response to any detected difference between the position of the data head and the position represented by the position signal, whereby the low frequency filter is used to compensate for low frequency tracking errors;
    micro-positioning means for finely positioning the data head in accordance with the position signal concurrently with the positioning of the data head by the stepper means, wherein the micro-positioning means further comprises:
        means for generating a magnetic field in accordance with the position signal;
        a magnetostrictive element to position the data head in response to the magnetic field; and
        a high frequency filter for adjusting the position of the data head in response to any detected difference between the position of the data head and the position represented by the position signal, whereby the high frequency filter is used to apply only the higher frequency portion of the position signal to finely position the data head;
    the position signal having a magnitude related to a desired change in position of the data head, the head assembly further comprising:
        means for biasing the magnetostrictive element at an operating point at which the change in position of the data head is substantially linearly related to the magnitude of said position signal, wherein the means for biasing further comprises:
            means for prestressing the magnetostrictive element; and
            means for compressing the magnetostrictive element in the range of about 2000 psi.

2. The head assembly of claim 1 wherein the means for prestressing the magnetostrictive element further comprises:
    lever means supporting the data head for motion in response to changes in the magnetostrictive element resulting from changes in the magnetic field.

3. The head assembly of claim 2 wherein the lever means further comprises:
    a lever supporting the data head at a first end thereof;
    cantilever support means for supporting a second end of the lever; and
    adjustable screw means for compressing the magnetostrictive element with respect to the cantilever support means.

4. The head assembly of claim 3 wherein the lever contacts the magnetostrictive element at a contact point closer to the second end of the lever than the first end so that changes in the magnetostrictive element provide larger changes in data head position.

5. The head assembly of claim 4 further comprising:
    housing means positioned by the stepper means for supporting the magnetostrictive element.

6. The head assembly of claim 5 wherein the stepper means further comprises:
    a stepper motor, and;
    a lead screw rotated by the stepper motor and in threaded engagement with the housing means. desired change in position of the head assembly, and the micro-positioning step further comprises the step of:
    biasing the magnetostrictive element at an operating point at which the change in position of the head assembly resulting from the application of a position signal is substantially linearly related to the magnitude of said position signal.

7. A method of positioning a head assembly in a data storage system, comprising the steps of:
    coarsely positioning the head assembly in a data storage system with a stepper motor in accordance with a position signal, wherein the step of coarsely positioning the head assembly further comprises the steps of:
        positioning the head assembly in an open loop mode to a step position having a predetermined relationship to the position signal;
        positioning the head assembly in an open loop mode to a position represented by the position signal;
        adjusting the position of the head assembly in a feedback mode in response to any detected difference between the position of the head assembly and the position represented by the position signal;
        coarsely positioning the head assembly to a position represented by the position signal; and
        adjusting the position of the head assembly by utilizing a low frequency filter for adjusting the position of the data head in response to any detected difference between the position of the data head and the position represented by the position signal, whereby the low frequency filter is used to compensate for low frequency tracking errors;
    micro-positioning the head assembly in accordance with the position signal, wherein the micro-positioning step further comprises the steps of:
        generating a magnetic field in response to the position signal;
        applying the magnetic field to a magnetostrictive element to position the head assembly: and
        applying a high frequency portion of the position signal to finely position the data head; and
    the position signal having a magnitude related to a desired change in position of the head assembly, and the micro-positioning step further comprising the step of:
        biasing the magnetostrictive element at an operating point at which the change in position of the data head is substantially linearly related to the magnitude of said position signal, wherein the biasing step further comprises the step of prestressing the magnetostrictive element, wherein the prestressing step further comprises the step of compressing the magnetostrictive element in the range of about 2000 psi.

8. The method of positioning a head assembly claimed in claim 7 wherein the prestressing step further comprises the step of:
supporting the head assembly with a lever for motion in response to changes in the magnetostrictive element resulting from changes in the magnetic field.

9. The method of positioning a head assembly claimed in claim 8 wherein the step of supporting the head assembly further comprises the steps of:
supporting the head assembly at a first end of a lever;
supporting a second end of the lever in a cantilever fashion; and
adjustably compressing the magnetostrictive element with the lever.

10. The method of positioning a head assembly claimed in claim 9 wherein the lever contacts the magnetostrictive element at a contact point closer to the second end of the lever than the first end so that changes in the magnetostrictive element provide larger changes in head assembly position.

11. The method of positioning a head assembly claimed in claim 10 further comprising the steps of:
supporting the magnetostrictive element in a housing; and
positioning the housing with the stepper motor.

12. The method of positioning a head assembly claimed in claim 11 wherein the step of positioning the housing further comprises the step of:
rotating a lead screw in threaded engagement with the housing.

13. A head assembly for use in a data storage system, comprising:
a data head;
stepper means responsive to a position signal for coarsely positioning the data head, comprising
open loop means for positioning the data head to a step position having a predetermined relationship with the position signal;
servo loop means for positioning the data head to a position represented by the position signal; and
feedback means for adjusting the position of the data head in response to any detected difference between the position of the data head and the position represented by the position signal; and
micro-positioning means responsive to the position signal for finely positioning the data head wherein the position signal has a magnitude related to a desired change in position of the data head, comprising
means for generating a magnetic field in response to the position signal;
a magnetostrictive element to position the data head in response to the magnetic field; and
biasing means for compressing the magnetostrictive element in the range of about 2000 psi to prestress it at an operating point at which the change in position of the data head is substantially linearly related to the magnitude of said position signal.

14. The head assembly of claim 13 wherein the biasing means for compressing the magnetostrictive element further comprises:
lever means supporting the data head for motion in response to changes in the magnetostrictive element resulting from changes in the magnetic field.

15. The head assembly of claim 14 wherein the lever means further comprises:
a lever supporting the data head at a first end thereof;
cantilever support means for supporting a second end of the lever; and
adjustable screw means for compressing the magnetostrictive element with respect to the cantilever support means.

16. The head assembly of claim 15 wherein the lever contacts the magnetostrictive element at a contact point closer to the second end of the lever than the first end so that changes in the magnetostrictive element provide larger changes in data head position.

17. The head assembly of claim 16 further comprising:
housing means positioned by the stepper means for supporting the magnetostrictive element.

18. The head assembly of claim 17 wherein the stepper means further comprises:
a stepper motor, and;
a lead screw rotated by the stepper motor and in threaded engagement with the housing means.

19. A method of positioning a head assembly in a data storage system, comprising the steps of:
coarsely positioning a head assembly in a data storage system with a stepper motor in accordance with a position signal comprising the steps of
positioning the head assembly in an open loop mode to a step position having a predetermined relationship to the position signal;
positioning the head assembly in a servo loop mode to a position represented by the position signal; and
adjusting the position of the head assembly in a feedback mode in response to any detected difference between the position of the head assembly and the position represented by the position signal; and
micro-positioning the head assembly in response to the position signal wherein position signal has a magnitude related to a desired change in position of the head assembly, comprising the steps of
generating a magnetic field in response to the position signal;
applying the magnetic field to a magnetostrictive element to position the head assembly; and
biasing the magnetostrictive element by compressing it in the range of about 2000 psi to prestress it at an operating point at which the change in position of the data head is substantially linearly related to the magnitude of said position signal.

20. The method of positioning a head assembly claimed in claim 19 wherein the biasing step further comprises the step of:
supporting the head assembly with a lever for motion in response to changes in the magnetostrictive element resulting from changes in the magnetic field.

21. The method of positioning a head assembly claimed in claim 20 wherein the step of supporting the head assembly further comprises the steps of:
supporting the head assembly at a first end of a lever;
supporting a second end of the lever in a cantilever fashion; and
adjustably compressing the magnetostrictive element with the lever.

22. The method of positioning a head assembly claimed in claim 21 wherein the lever contacts the magnetostrictive element at a contact point closer to the second end of the lever than the first end so that changes in the magnetostrictive element provide larger changes in head assembly position.

23. The method of positioning a head assembly claimed in claim 22 further comprising the steps of:
   supporting the magnetostrictive element in a housing; and
   positioning the housing with the stepper motor.

24. The method of positioning a head assembly claimed in claim 23 wherein the step of positioning the housing further comprises the step of:
   rotating a lead screw in threaded engagement with the housing.

25. A head assembly for use in a data storage system, comprising:
   a data head;
   stepper means responsive to a position signal for coarsely positioning the data head, wherein the stepper means further comprises:
      servo loop means for coarsely positioning the data head to a position represented by the position signal; and
      feedback means comprising a low frequency filter for adjusting the position of the data head in response to any detected difference between the position of the data head and the position represented by the position signal, whereby the low frequency filter is used to compensate for low frequency tracking errors; and
   micro-positioning means for finely positioning the data head in accordance with the position signal wherein the position signal has a magnitude related to a desired change in position of the data head, comprising:
      means for generating a magnetic field in response to the position signal;
      a magnetostrictive element to position the data head in response to the magnetic field; and
      biasing means for prestressing the magnetostrictive element at an operating point at which the change in position of the data head is substantially linearly related to the magnitude of said position signal, wherein the biasing means for prestressing the magnetostrictive element further comprises:
         means for compressing the magnetostrictive element in the range of about 2000 psi.

26. The head assembly of claim 25 wherein the means for prestressing the magnetostrictive element further comprises:
   lever means supporting the data head for motion in response to changes in the magnetostrictive element resulting from changes in the magnetic field.

27. The head assembly of claim 26 wherein the lever means further comprises:
   a lever supporting the data head at a first end thereof;
   cantilever support means for supporting a second end of the lever; and
   adjustable screw means for compressing the magnetostrictive element with respect to the cantilever support means.

28. The head assembly of claim 27 wherein the lever contacts the magnetostrictive element at a contact point closer to the second end of the lever than the first end so that changes in the magnetostrictive element provide larger changes in data head position.

29. A method of positioning a head assembly in a data storage system, comprising the steps of:
   coarsely positioning a head assembly in a data storage system with a stepper motor in accordance with a position signal; and
   micro-positioning the head assembly in accordance with the position signal wherein the position signal has a magnitude related to a desired change in position of the head assembly, comprising the steps of:
      generating a magnetic field in response to the position signal;
      applying the magnetic field to a magnetostrictive element to position the head assembly; and
      biasing the magnetostrictive element by prestressing it at the operating point at which the change in position of the data head is substantially linearly related to the magnitude of said position signal, wherein the biasing step for prestressing the magnetostrictive element further comprises the steps of:
         compressing the magnetostrictive element in the range of about 2000 psi; and
         supporting the head assembly with a lever for motion in response to changes in the magnetostrictive element resulting from changes in a magnetic field.

30. A head assembly for use in a data storage system that includes a magnetic storage medium having a plurality of data tracks, comprising:
   a data head;
   means for generating a position signal indicating position of said data head with respect to a selected one of said data tracks;
   stepper means for coarsely positioning the data head in accordance with the position signal, wherein the stepper means further comprises:
      open loop means for positioning the data head to a step position having a predetermined relationship with the position signal;
      servo loop means for positioning the data head to a position represented by the position signal;
      feedback means for adjusting the position of the data head in response to detected difference between the position of the data head and the position represented by the position signal;
      servo loop means for coarsely positioning the data head to a position represented by the position signal; and
      feedback means comprising a low frequency filter for adjusting the position of the data head in response to detected difference between the position of the data head and the position represented by the position signal, whereby the low frequency filter is used to compensate for low frequency tracking errors; and
   micro-positioning means for finely positioning the data head in accordance with said position signal independently from the positioning of the data head by the stepper means, wherein the micro-positioning means further comprises:
      means for generating a magnetic field in accordance with the position signal;
      a magnetostrictive element for positioning the data head in response to the magnetic field; and
      a high frequency filter for adjusting the position of the data head in response to any detected difference between the position of the data head and the position represented by the position signal, whereby the high frequency filter is used to apply only the higher frequency portion of the position signal to finely position the data head;

the position signal having a magnitude relating to a desired change in position of the data head, the head assembly further comprising:

means for biasing the magnetostrictive element at an operating point at which the change in position of the data head is substantially linearly related to the magnetic of said position signal, wherein the means for biasing further comprises:

means for prestressing the magnetostrictive element; and means for compressing the magnetostrictive element in the range of about 2000 psi.

31. The head assembly of claim 30 wherein the means for prestressing the magnetostrictive element further comprises:

lever means supporting the data head for motion in response to changes in the magnetostrictive element resulting from changes in the magnetic field.

32. The head assembly of claim 31 wherein the lever means further comprises:

a lever supporting the data head at a first end thereof;

cantilever support means for supporting a second end of the lever; and adjustable screw means for compressing the magnetostrictive element with respect to the cantilever support means.

33. The head assembly of claim 32 wherein the lever contacts the magnetostrictive element at a contact point closer to the second end of the lever than the first end so that changes in the magnetostrictive element provide larger changes in data head position.

34. The head assembly of claim 33 further comprising:

housing means positioned by the stepper means for supporting the magnetostrictive element.

35. The head assembly of claim 34 wherein the stepper means further comprises:

a stepper motor, and;

a lead screw rotated by the stepper motor and in threaded engagement with the housing means.

* * * * *